United States Patent [19]
Greenleaf et al.

[11] 3,905,134
[45] Sept. 16, 1975

[54] AIR ADJUSTABLE SHOCK ABSORBER DEMONSTRATION STAND

[75] Inventors: Donald B. Greenleaf, Dearborn; Dennis J. Smith, St. Clair Shores, both of Mich.

[73] Assignee: Monroe Auto Equipment Company, Monroe, Mich.

[22] Filed: Mar. 25, 1974

[21] Appl. No.: 454,381

[52] U.S. Cl. .................................................. 35/49
[51] Int. Cl.² ........................................ G09B 25/00
[58] Field of Search ....................... 35/28, 49, 50, 53

[56] References Cited
UNITED STATES PATENTS

| | | | |
|---|---|---|---|
| 1,833,726 | 11/1931 | Stoddard | 35/49 |
| 2,494,072 | 1/1950 | Vetterli | 35/53 |
| 2,837,962 | 6/1958 | Kneitel | 35/28 UX |
| 3,715,813 | 2/1973 | Wiegand | 35/49 |

*Primary Examiner*—Harland S. Skogquist
*Attorney, Agent, or Firm*—Harness, Dickey & Pierce

[57] ABSTRACT

A demonstration stand for an air adjustable shock absorber has a support structure which includes a base frame connected to one end of the shock absorber and an uprightly extending support panel having a visual display of at least a portion of an unsprung mass of a vehicle. An opposite end of the shock absorber is drivingly connected to the display panel which includes a visual representation of the sprung portion of the vehicle superimposed relative to the display of the unsprung portion. The display panel is pivotably connected to the support panel and the representation of the sprung portion is displaced from a generally inclined to a level attitude in response to charging an air chamber in the shock absorber with a pressurized fluid, whereby to provide a visual indication of the influence of the shock absorber on the relative attitude of the sprung portion of the depicted vehicle with respect to the unsprung portion thereof.

15 Claims, 4 Drawing Figures

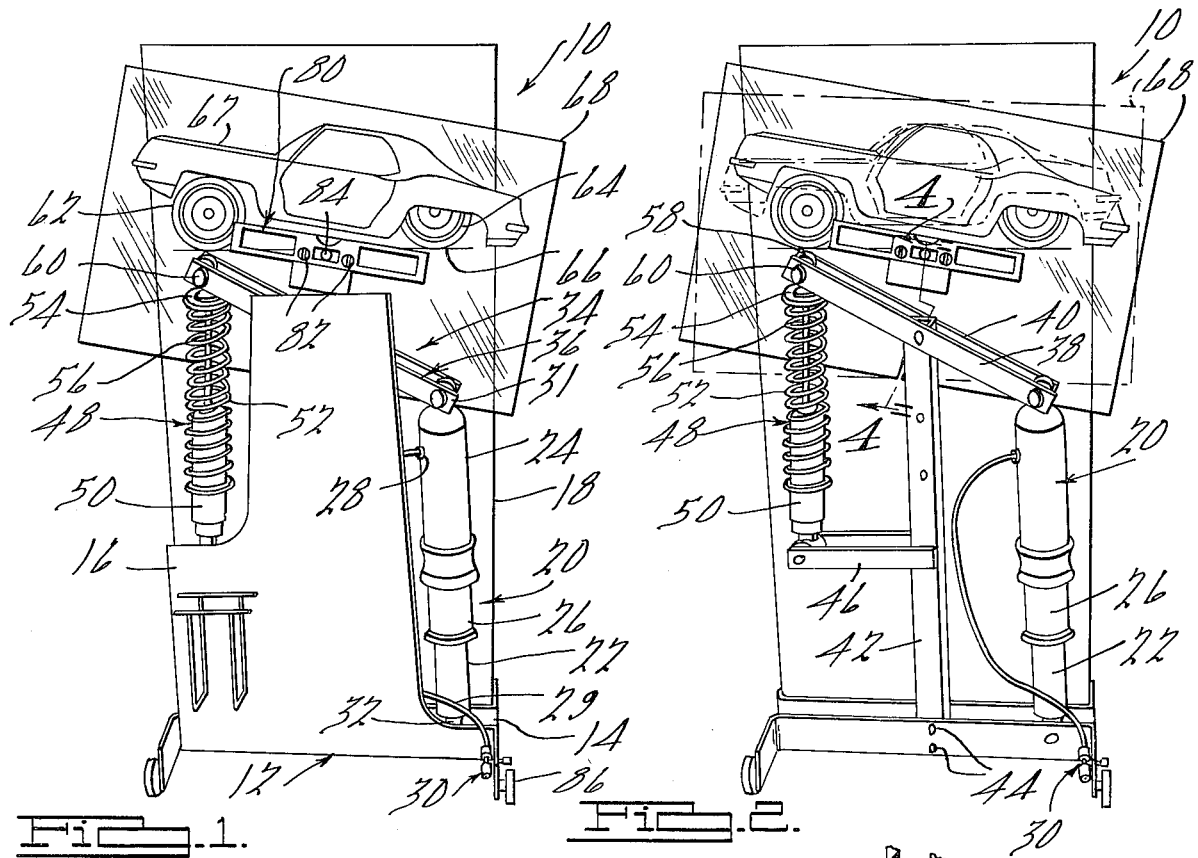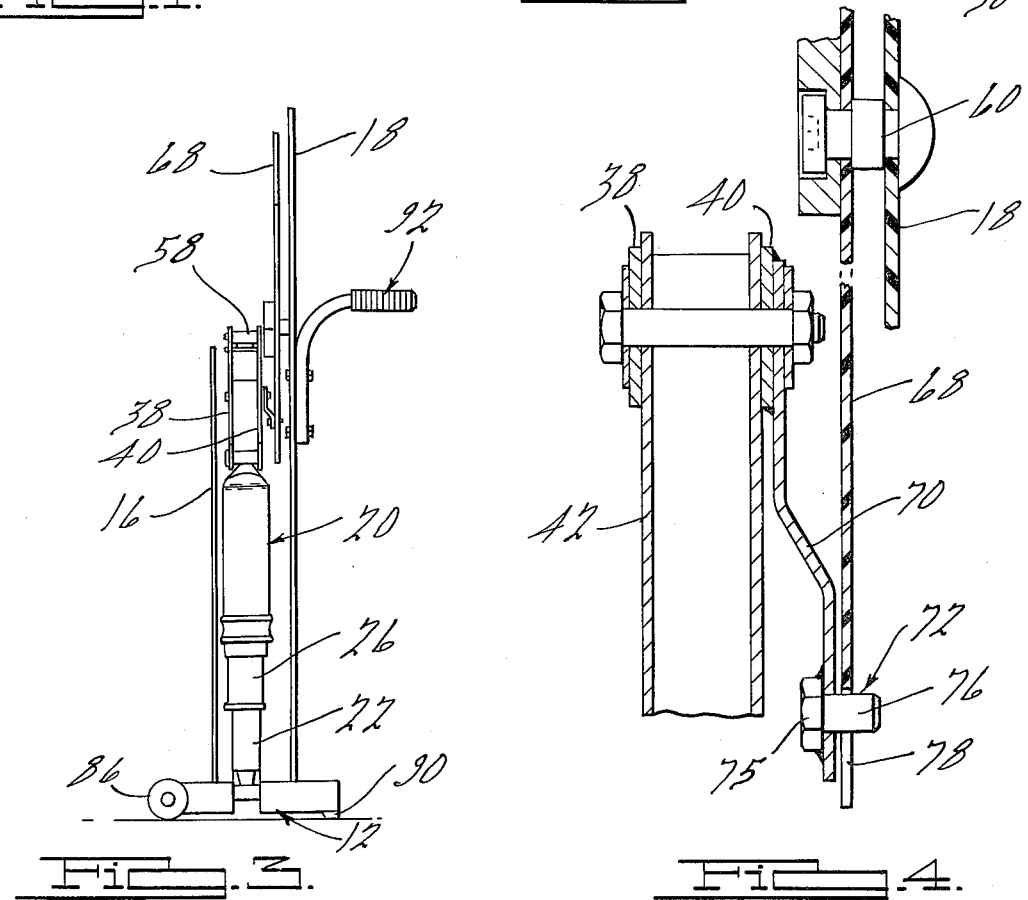

AIR ADJUSTABLE SHOCK ABSORBER DEMONSTRATION STAND

BACKGROUND AND SUMMARY OF THE INVENTION

The present invention relates generally to shock absorber demonstration stands and more particularly to a stand for demonstrating the utility of a combination shock absorber-leveling unit in maintaining a substantially level attitude between the sprung and unsprung masses of an automotive vehicle or the like.

Heretofore, demonstration stands have been devised for portraying the damping qualities of telescopic, direct acting shock absorbers. These stands have conventionally been characterized by a spring biased lever arm to which one end portion of a shock absorber is attached, with the opposite end being attached to a relatively stationary portion of the stand. By manipulation of the lever arm, one can demonstrate and be appraised of the damping characteristics of a particular shock absorber. Other stands have been developed for demonstrating the differences in damping characteristics of a load leveling type shock absorber (for example, see U.S. Pat. No. 3,715,814). With respect to these latter types of stands, a control of the load leveling adjustment is provided whereby one can experience the differences in damping characteristics of the shock absorber in various selective adjustable positions. In a load leveling type of shock absorber, however, the damping characteristics comprise only a portion of the functional purpose of the unit. The basic function of a load leveler is to selectively maintain a level attitude between the sprung and unsprung masses which results in increasing the stability and road handling. Accordingly, it is a general object of the subject invention to provide a stand for demonstrating the basic function and purpose of a combination load leveling shock absorber.

In the present invention a visual display of the sprung mass of an automotive vehicle or the like is drivingly connected to an air adjustable leveling unit. In response to charging an air chamber of the unit with a pressurized fluid, the attitude of the sprung mass is elevated to a substantially level position relative to a display of the unsprung mass. It, therefore, is another object of the present invention to provide a demonstration stand for an air adjustable shock absorber unit displaying the leveling function.

In the present invention the air adjustable leveling unit is fixedly connected at one end to a relatively stationary support structure with an opposite end being connected to an actuating mechanism which includes a lever pivotably supported by the support structure. An opposite end of the lever is preferably spring biased, for example, by means of a spring associated shock absorber of the type which may be typically installed in the front end of the vehicle. In the demonstration stand of the present invention the spring biasing means of the supplementary unit is stressed in response to the leveling unit being elongated so that upon de-energization of the leveling unit, the spring biasing means will automatically resiliently urge the lever and leveling unit towards a predetermined deactuated position. Hence, by utilizing a typical spring associated shock absorber as the spring biasing means for the lever arm, the operation of a shock absorber employing a supplementary spring is simultaneously visualized in combination with the leveling unit. It, therefore, is still another object of the present invention to provide a demonstration stand for displaying a complete vehicular load leveling system.

The present invention preferably, although not necessarily, includes a level indicating device in the form of a conventional sight glass which is partially filled with fluid. In response to pivotal movement of the visual display of the sprung portion to a substantially level attitude, a bubble formed by the fluid is disposed in a conventional manner between a pair of graduations. It, therefore, is a further object of the present invention to provide a visual indication of a level attitude between the sprung and unsprung masses of the vehicle.

It is yet another object of the present invention to provide a demonstration stand for an air responsive shock absorber unit of the above indicated character which is of a relatively simple design, is economical to manufacture, is extremely portable, and which provides a visual simulation of the operational characteristics of an air responsive shock absorber.

Other objects and advantages of the present invention will become apparent from the following detailed description taken in conjunction with the accompanying drawings.

BRIEF DESCRIPTION OF THE DRAWINGS

FIG. 1 is a front elevational view in perspective of an exemplary demonstration stand for an air adjustable shock absorber in accordance with a preferred embodiment of the present invention;

FIG. 2 is another front elevational view in perspective of the demonstration stand illustrated in FIG. 1 with a front panel being removed to reveal the inner structural details thereof;

FIG. 3 is an end view of the demonstration stand illustrated in FIG. 1; and

FIG. 4 is a cross-sectional elevational view of the demonstration stand illustrated in FIG. 2 taken on the lines 4—4 thereof.

DETAILED DESCRIPTION OF THE PREFERRED EMBODIMENT

With reference to FIG. 1 of the drawings, an exemplary demonstration stand in accordance with a preferred embodiment of the present invention is indicated generally at 10. The stand 10 includes a relatively stationary, yet transportable, support structure 12 which is comprised of a lower base section 14, a front cover panel 16 and a rearwardly located, uprightly extending support panel 18. For convenience of description, terms such as "right," "left," "upper," "lower," "front," "rear" and words of similar import will have reference to the demonstration stand 10 of the present invention as it is illustrated in FIGS. 1 and 2 of the drawings and described hereinafter in detail. Likewise, terms such as "inner," "outer" and derivatives thereof will have reference to the geometric center of the stand 10 and the various component parts thereof.

The demonstration stand 10 of the present invention is particularly adapted to demonstrate the operation of a combination shock absorber-leveling unit of the type that is adjustable so as to vary the attitude between the sprung and unsprung masses of a vehicle. Generally speaking, this type of unit is conventionally mounted between sprung and unsprung masses of the vehicle in substantially the same location that a conventional shock absorber normally occupies, adjacent each of the suspension spring means thereof. Accordingly, the leveling unit can function not only as a shock absorber to dampen relative movement between the sprung and unsprung masses when an associated variable volume chamber is not pressurized, but also as a leveling strut upon pressurization of an expandable chamber which results in the unit elongating whereby to displace the sprung mass relative to the unsprung mass and optimize the stabilization of the vehicle through the provision of a relatively level vehicular attitude. The leveling unit can be of various constructions well known in the art and, for purposes of description and identification, is indicated generally by the numeral 20 and is shown as being generally comprised of a direct acting tubular shock absorber assembly 22, a generally cup shaped dirt shield 24 arranged generally coaxially of the assembly 22, and a generally tubular shaped diaphragm member 26 which extends between and cooperates with the dirt shield 24 and the outer periphery of the assembly 22 to define a variable volume air chamber. To facilitate charging the air chamber with a pressurized fluid, such as air, an inlet fitting 28 is located on the dirt shield 24 and is adapted to be connected to the pressure source via a suitable air hose or the like 29 and Schroeder type air valve or the like 30. The unit 20 also includes end fittings or attachment elements 31 and 32 located at opposite longitudinal ends thereof which are conventionally adapted to be connected to the sprung and unsprung masses of the vehicle respectively. For purposes of demonstrating the utility and operation of the leveling unit 20, however, the lower end fitting 32 is connected to the base frame 14 with the upper end fitting 31 being connected to one end of an actuating mechanism 34.

As best seen in FIGS. 2 and 3, the mechanism 34 includes a lever 36 formed by spaced first and second generally coextensive, parallel spaced plates 38 and 40 which are disposed on opposite sides of an upwardly extending support column 42 and pivotably connected thereto via suitable fastener assembly 43. The lower end of the column 42 is fixedly secured to the base section 14 via suitable fastener elements 44 and carries a horizontally extending arm 46 at an intermediate position thereof. The right end of the arm 46 is fixedly connected to the column 42, preferably by welding, with the left end thereof adapted to support a spring biasing means which cooperates with the mechanism 34 and is shown herein as comprising a combination shock absorber-supplementary suspension spring assembly 48.

In the present invention the spring means is adapted to bias the left end of the mechanism 34 in an upward or clockwise direction to retract the leveling unit in response to depressurizing the associated air chamber. It will be noted, however, that in lieu of the assembly 48, various types of suitable springs could be substituted and satisfactorily function for this purpose. By using the combination shock absorber-suspension spring assembly 48, however, the stand serves the dual purpose of demonstrating a complete leveling system for the front and rear portion of a vehicle.

In this regard, the assembly 48 is typically of the type which is adapted to complement or stiffen the front suspension system of the vehicle and for purposes of description includes a shock absorber assembly 50 having a lower end fitting connected to the outer end of the arm 46 and a coil spring 52 having a lower end fixedly connected to the assembly 50 and an upper end adjustably biased against a retaining collar 54 supported at an upper end of a piston rod 56. The piston rod 56 has an attachment ring 58 which is connected via a suitable fastener 60 to the left end of the lever 36. Upon pressurization of the strut 20 by connecting the valve 30 with suitable pressurized gas, the dirt shield will move longitudinally or telescopically upwardly relative to the shock due to the increased pressure within the air chamber resulting in the lever 36 pivoting in a counterclockwise direction in FIGS. 1 and 2, which results in compressing the coil spring 52 thereby not only demonstrating the utility of the stand 20, but also the operation of the unit 48. In addition to demonstrating the utility, however, the resulting compressive force applied to the spring 52 is subsequently utilized to bias the lever 36 in a clockwise direction whereby to return the leveling unit 20 to its original retracted position in response to depressurizing the associated air chamber.

In accordance with the principles of the present invention, a visual image or illustration is provided as to how the operation of the strut 20 affects the relative attitude between the sprung and unsprung portions of a vehicle. More particularly, the present invention is adapted to provide a visual indication of how the attitude of a heavily loaded vehicle is changed from a rearwardly inclined orientation to a relatively level or horizontal position in response to charging the air chamber of the leveling unit 20. In this regard the relatively stationary rear support panel 18 includes a representation of the unsprung portion which, by way of example, can be characterized by a pair of wheels 62 and 64 disposed on a relatively level surface represented by a horizontal line 66. A display panel 68 which is preferably transparent and is pivotably connected to the support panel 18 via a suitable pivot pin or the like 60, includes a visual representation of the sprung mass which is characterized by a chassis 67 superimposed over the wheels 62 and 64 to form a visual display of an exemplary automotive vehicle. As shall hereinafter be explained, the chassis 67 is pivoted from an inclined to a level attitude relative to the line 66 in response to charging the air chamber of the unit 20.

With reference to FIG. 4, one end of an actuating arm 70 is fixedly connected, preferably by welding, to the lever 36. A lower opposite end of the actuating arm 70 carries a connector pin 72 which includes an enlarged head 75 fixedly secured to the arm 70 and a cylindrically shaped camming section 76 which is disposed in an upwardly extending slot 78, the latter being formed in the lower edge of the display panel 68. The length of the actuating arm 70 is such that when the leveling unit 20 is elongated to its expanded position, the display panel 68 will be pivoted from the generally inclined position (shown in phantom lines in FIG. 2) to the generally level or horizontal position (shown in solid lines in FIG. 2). Correspondingly, the visual display of the chassis 67 is pivoted from an inclined to a generally level attitude relative to the line 66. To further characterize the resulting level attitude, the stand 10 preferably includes a conventional level indicating device 80 which is fixedly secured to the display panel 68 via suitable fastener means 82 and which includes a sight glass 84 partially filled with a fluid to define a bubble. In response to a level condition the bubble is centered between appropriate graduations formed on the sight glass, thereby further demonstrating as to how the strut 20 functions to "level" the sprung portion of the depicted vehicle when the strut 20 is properly energized or pressurized.

To operate the demonstration stand 10, assume initially that the unit 20 is in its retracted position and that the visual representation of the vehicle is as illustrated in FIG. 1 wherein the chassis 67 is substantially inclined relative to the line 66 which is visually representative of a highly loaded vehicle as shown by the solid lines in FIG. 2. Assume further that a suitable source of pressurized fluid is connected to the hose 29 via the valve assembly 30 for communicating the pressurized fluid from the pressure source to the air chamber of the unit 20. Upon communication of pressurized fluid to the air chamber, the upper end of the leveling unit 20 will move upwardly thereby pivoting the lever 36 in a counterclockwise direction about an axis defined by the assembly 43. The actuating arm 70, connected to the lever 36, will correspondingly be pivoted counterclockwise whereby to rotate the display panel 68 about an axis defined by the pivot pin 60 from the solid line position in FIG. 2 to the phantom line position in FIG. 2. As the panel 68 is thus pivoted, the vehicle chassis 67 depicted thereon will assume a substantially level attitude relative to the line 66 and the level 80 will simultaneously be moved to a "level" or horizontal position. As the same time, however, the supplementary spring 52 of the unit 48 is compressed to simulate a load applied thereon. The demonstration is completed and the unit 20 returned to its initial position be depressurizing the air chamber which permits the lever 36 and panel 68 to pivot in a clockwise direction due to the force applied by the bias of the compressed coil spring 52 acting on the left end of the lever 36.

A particular advantage of the subject invention resides in the portable nature of the demonstration stand 10. In this regard, as best seen in FIG. 3, the base frame 14 is provided at one end with a pair of rollers or casters 86 which support one end of the stand 10. The end of the base frame 14 opposite the casters is provided with a pair of spaced legs 90 which are adapted to maintain the panels 16 and 18 in a substantially vertically extending position. The rear support panel 18 is provided with a suitable, manually engageable handle or the like 92 which may be and preferably is adapted to be gripped by the operator for tilting the end of the stand 10 to raise the legs 90 upwardly to permit the operator to transport or wheel the stand 10, for example between a storage location and the location where the leveling unit demonstration is to be performed. Other advantages of the subject demonstration stand reside in the extremely simple and straight-forward manner in which a visual image is provided as to the operation and leveling effect of an air adjustable leveling strut. Still another feature of the present invention resides in the capability of the stand 10 to display both a combination shock absorber-leveling unit and a supplementary suspension type shock absorber in a single unitized structure.

While it will be apparent the preferred embodiment illustrated herein is well calculated to fullfil the objects above stated, it will be appreciated that the present invention is susceptible to modification, variation and change without departing from the scope of the invention.

What is claimed is:

1. In an apparatus for demonstrating how the operation of a fluid adjustable vehicular leveling unit affects the orientation or relative attitude of the sprung portion of a vehicle relative to the unsprung portion thereof,
  a first structure depicting a visual representation of one of the vehicle portions;
  a second structure movable supported adjacent said first structure and depicting a visual representation of the other of the vehicle portions, said first and second structures normally being oriented such that said vehicle portions are disposed in a first relative orientation; and
  means operatively supporting a leveling unit, and actuating means responsive to operation of the leveling unit for displacing one of said structures relative to the other thereof to cause said visual representation of said vehicle portions to be disposed in a second relative orientation.

2. The apparatus as recited in claim 1 which includes a support structure having a base and one of said structures supported thereon, said base being operatively connected to one end of said leveling unit.

3. The apparatus as recited in claim 2 wherein said apparatus comprises a portable demonstration stand which includes roller means connected to said base for rolling said stand, and handle means connected to said panel to manually facilitate said rolling movement.

4. The apparatus as recited in claim 1 wherein said first and second structures comprise first and second panels, one of which is drivingly connected to said actuating means whereby to effect relative movement between said visual representation of said sprung and unsprung vehicle portions in response to displacement of said leveling unit.

5. The apparatus as recited in claim 1 wherein said actuating means comprises a pivotable lever connected at one portion thereof to said leveling unit.

6. The apparatus as recited in claim 5 which includes an arm having on portion thereof connected to said lever and another portion thereof connected to said second structure.

7. The apparatus as recited in claim 1 which includes means for detecting a level orientation between said representation of said sprung and unsprung vehicle portions.

8. The apparatus as recited in claim 7 wherein said last mentioned means is a level indicating device which includes a sight glass, fluid located in said sight glass forming a bubble that is selectively movable in response to changes in attitude between said representation of said sprung and unsprung vehicle portions.

9. The apparatus as recited in claim 1 wherein said leveling unit is an air adjustable shock absorber having a pressurizable air chamber, and wherein said second structure is movable relative to said first structure in response to variations in air pressure in said air chamber.

10. The apparatus as recited in claim 9 which includes spring means associated with said actuating means for displacing said one structure relative to said other structure for restoring said vehicle portions to said first relative orientation.

11. The apparatus as recited in claim 10 wherein spring means comprises a combination spring and shock absorber assembly having connected to said first structure and said actuating means, said spring of said assembly being compressible in response to charging said air chamber of said air adjustable shock absorber.

12. A demonstration stand for a pressurizable adjustable shock absorber that is intended to be used in the suspension system of a vehicle having sprung and unsprung portions, said stand comprising a support structure including a base section connected to one end of said shock absorber, and an uprightly extending panel supported by said base section with said panel including a visual display of the unsprung portion of a vehicle;

display means movably supported on said stand and including a representation of the sprung portion of the vehicle superimposed relative to said display of said unsprung vehicle portion; and connecting means operatively connecting said display means with one portion of said shock absorber for moving said display means in response to pressurization of said shock absorber, whereby said display means is movable from a first position wherein said representation of said sprung vehicle portion is inclined relative to said representation of said unsprung vehicle portion, to a second position wherein said representation of said sprung vehicle portion assumed a relatively level attitude with respect to said representation of said unsprung vehicle portion.

13. The stand as recited in claim 12 which includes means for providing a visual indication of said level attitude between said representation of each sprung and unsprung vehicle portion.

14. The stand as recited in claim 12 which includes a combination spring and shock absorber unit interposed between said connecting means and said support structure and subject to be compressed in response to pressurization of said shock absorber.

15. The stand as recited in claim 14 wherein said connecting means includes a lever pivotably supported by said support structure and connected at opposite ends to said shock absorber and said combination spring loaded and shock absorber unit.

* * * * *

UNITED STATES PATENT OFFICE
CERTIFICATE OF CORRECTION

Patent No. 3,905,134　　　　　　　　　　Dated　September 16, 1975

Inventor(s)　Donald B. Greenleaf et al.

It is certified that error appears in the above-identified patent and that said Letters Patent are hereby corrected as shown below:

Column 3, line 48 after "thereof" insert -- being ---.

Claim 1, line 9, "movable" should be -- movably --.

Claim 6, line 2, "on" should be -- one --.

Claim 15, line 5, delete "loaded".

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*